(12) United States Patent
Ast et al.

(10) Patent No.: US 10,298,613 B2
(45) Date of Patent: *May 21, 2019

(54) MITIGATION OF DISTRIBUTED DENIAL-OF-SERVICE ATTACKS

(71) Applicant: Amazon Technologies, Inc., Seattle, WA (US)

(72) Inventors: Jered D. Ast, Lewisville, TX (US); Greg Allen Bur, Dover, NH (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/595,780

(22) Filed: May 15, 2017

(65) Prior Publication Data
US 2017/0251018 A1 Aug. 31, 2017

Related U.S. Application Data

(63) Continuation of application No. 14/571,024, filed on Dec. 15, 2014, now Pat. No. 9,654,501.

(51) Int. Cl.
*H04L 12/801* (2013.01)
*H04L 9/00* (2006.01)
*H04L 29/06* (2006.01)
*H04L 12/721* (2013.01)
*H04L 12/813* (2013.01)

(52) U.S. Cl.
CPC .......... *H04L 63/1458* (2013.01); *H04L 45/72* (2013.01); *H04L 63/1416* (2013.01); *H04L 63/20* (2013.01); *H04L 47/20* (2013.01); *H04L 63/0236* (2013.01)

(58) Field of Classification Search
None
See application file for complete search history.

(56) References Cited

U.S. PATENT DOCUMENTS

| 6,189,035 B1 * | 2/2001 | Lockhart | H04L 29/06 370/230 |
| 7,149,291 B1 * | 12/2006 | Deshpande | H04L 47/10 379/112.01 |
| 9,036,468 B1 * | 5/2015 | Agarwal | H04L 47/32 370/230 |

(Continued)

OTHER PUBLICATIONS

"Oracle Infrastructure and Platform Cloud Services Security," Oracle White Paper, Nov. 2016, 44 pages.

*Primary Examiner* — Alexander Lagor
(74) *Attorney, Agent, or Firm* — Davis Wright Tremaine, LLP

(57) ABSTRACT

A method and apparatus for mitigating a distributed denial-of-service attack are disclosed. In the method and apparatus a first set of data received from a computer system and addressed to a server is monitored over a first interval to determine whether one or more conditions for limiting computer system data are met. As a result of the one or more conditions for limiting the computer system data being met, a limit is placed on a second set of data provided to the server over a second interval. It is then determined whether one or more conditions for removing the limit are met and as a result of the one or more conditions for removing the limit being met, the limit is removed over an interval subsequent to the second interval.

20 Claims, 6 Drawing Sheets

(56) References Cited

U.S. PATENT DOCUMENTS

| | | |
|---|---|---|
| 2006/0075496 A1 | 4/2006 | Carpenter et al. |
| 2014/0075537 A1 | 3/2014 | Kim |
| 2014/0143850 A1* | 5/2014 | Barkai ................ H04L 63/0281 726/12 |

* cited by examiner

MITIGATION OF DISTRIBUTED DENIAL-OF-SERVICE ATTACKS

CROSS REFERENCE TO RELATED APPLICATIONS

This application is a continuation of U.S. patent application Ser. No. 14/571,024, filed Dec. 15, 2014, entitled "MITIGATION OF DISTRIBUTED DENIAL-OF-SERVICE ATTACKS," the content of which is incorporated by reference herein in its entirety.

BACKGROUND

Denial-of-service attacks, such as distributed denial-of-service attacks, are disruptive to electronic commerce. In a distributed denial-of-service attack, computer systems, which may be compromised, are used to overwhelm servers, such as web servers and mail servers, among others, so as to cause the servers to become unavailable for access by legitimate users. The computer systems may "flood" a server with data including, for example, web service requests. When the server is facing a high volume of traffic, backlogs may occur, whereby the server may not be timely processing user requests and may become at least temporarily unavailable to process the requests. That results in adverse economic impacts on various computer systems such as those supporting various organizations' operations. For example, electronic access to banks, retailers and government services may become unavailable due to the attacks.

It is often challenging to mitigate denial-of-service attacks and distributed denial-of-service attacks by selectively blocking participating computer systems and permitting traffic of legitimate users. Furthermore, it is challenging to ensure that if legitimate user traffic is mistakenly blocked, for example, due to a "false positive" identification, a computer system may later be permitted access to a server.

BRIEF DESCRIPTION OF THE DRAWINGS

Various embodiments in accordance with the present disclosure will be described with reference to the drawings, in which.

DETAILED DESCRIPTION

Figure 1:
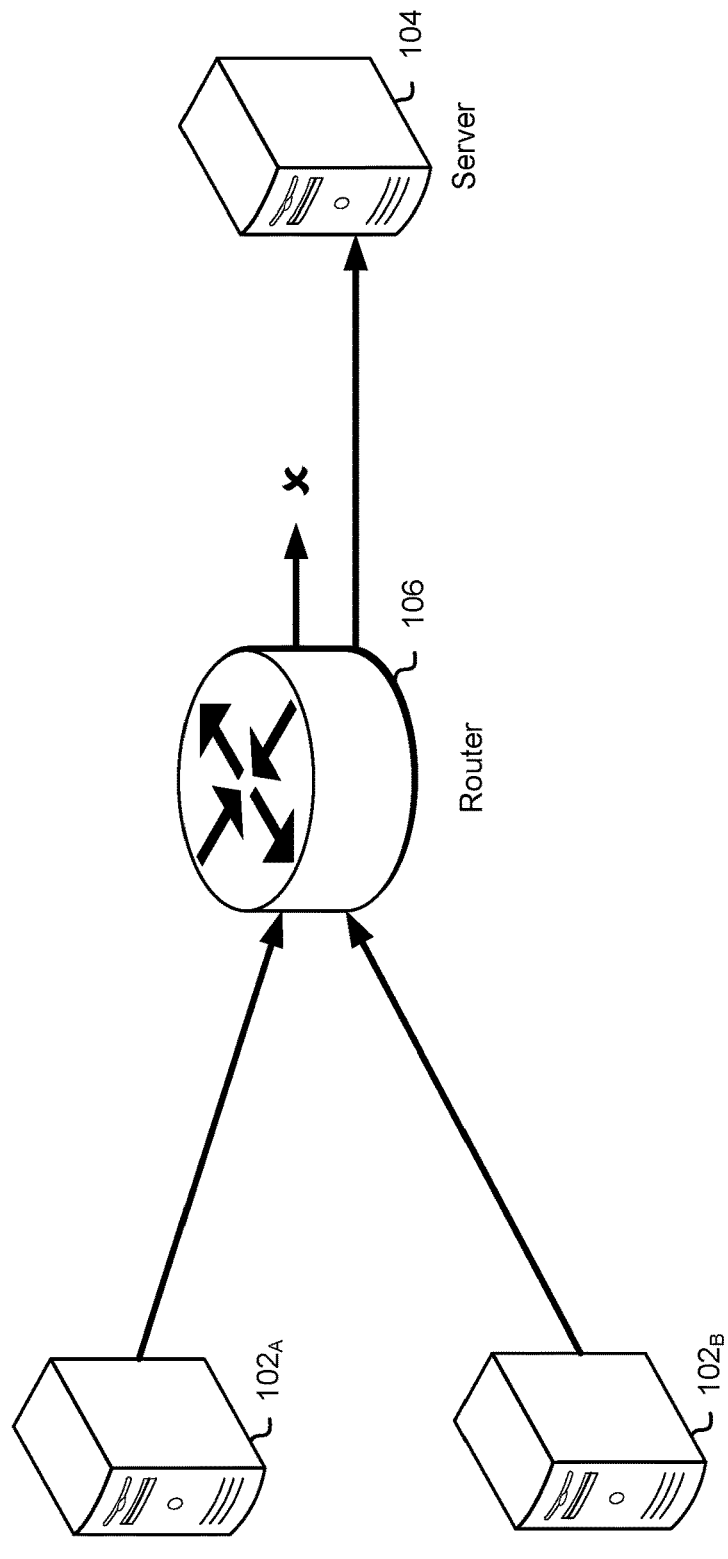
FIG. 1 shows an example of a router configured to mitigate a denial-of-service attack in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include mitigation of distributed denial-of-service attacks. In a distributed denial-of-service attack, a group of computer systems may be used to send data to servers, whereby the data may consume the computing resources of the servers and render the servers at least temporarily unavailable to process data received from other computer systems. In various embodiments, a distributed denial-of-service attack is mitigated through techniques for blocking, rate limiting or capping traffic.

To selectively block computer systems participating in the distributed denial-of-service attack against a server, the entirety of data addressed to a server may be monitored over a first observation interval. The monitored data may be received from a plurality of computer systems some of which are participating in the distributed denial-of-service attack. Monitoring the data may include determining a count of a number of packets of data received from each computer system of the plurality of computer systems over the first observation interval. When a packet is received, the address whose count is updated may be determined as or otherwise based at least in part on the specified source address of the packet. The first observation interval may correspond to a sequence of packets that are addressed to the server. For example, the sequence of packets may be consecutive packets that are addressed to the server and received, from the plurality of computer systems, by a router of a network routing data to the server. The number of packets having the same source address may then be compared to a first threshold of a number of packets. A number of packets in excess of the first threshold is used as an indicator that the computer system may be participating in a denial-of-service attack.

If the number of packets for the computer system exceeds the threshold, the computer system may be blocked from accessing the server during a second observation interval. As an alternative to blocking the computer system, the number of packets of the computer system that are to be provided to the server over the second observation interval may instead be capped. To reduce the likelihood of "false positives" (i.e., falsely identifying the computer system as participating in the denial-of-service attack when the computer system is not), packets received from the computer system over the second observation interval are monitored. It may be determined whether the number of packets received from the computer system over the second observation interval exceeds a second threshold. If the number of packets received from the computer system over the second observation interval exceeds the second threshold, packets received from the computer system over a third observation interval that is subsequent to the second observation interval may be continued to be blocked, rate-limited or capped. The number failing to exceed the second threshold is then used as an indicator that the computer system was falsely identified as participating in the denial-of-service attack. Thus, while the computer system may be blocked from accessing the server during the second observation interval, the computer system may be permitted access to the server during a subsequent third interval.

Accordingly, based at least in part on monitoring computer system data of an observation interval, a computer system may be blocked from accessing a server during a subsequent interval. Furthermore, if monitoring the data of the computer system of a previous observation interval results in blocking computer system access during an observation interval, the data of the computer system may be monitored while blocked so as to determine whether to remove the blocking during a subsequent interval.

FIG. 1 shows an example of a router configured to mitigate a denial-of-service attack in accordance with at least one embodiment. A plurality of computer system $102_{A,B}$ including a first computer system $102_A$ and a second computer system $102_B$ and individually referred to herein by the numeral 102 alone send data to a server 104. A computer system 102 may be any type of device configured to send data to the server 104, whereby the data may be packetized in accordance with a communication protocol. The packet may be, for instance, a transmission control protocol/Internet protocol (TCP/IP) packet. For example, the packet data may specify an address of the computer system 102 sending the data as well as a destination address of the server 104 that is the recipient of the data. Prior to being provided to the server 104, a router 106 receives the data for routing to the server 104. The router 106 evaluates the data sent by each computer system 102 to determine whether the computer system 102 is to be blocked from the server 104. As shown in FIG. 1, based at least in part on evaluating the data, the router 106 blocks the first computer system $102_A$ from accessing the server 104 and prevents the data associated with the first computer system $102_A$ from being provided to the server 104. The router 106 may discard the data instead of providing the data to the server. Conversely, the router 106 permits providing the data associated with the second computer system $102_B$ to the server 104 based at least in part on evaluating the data of the second computer system $102_B$.

Figure 2:
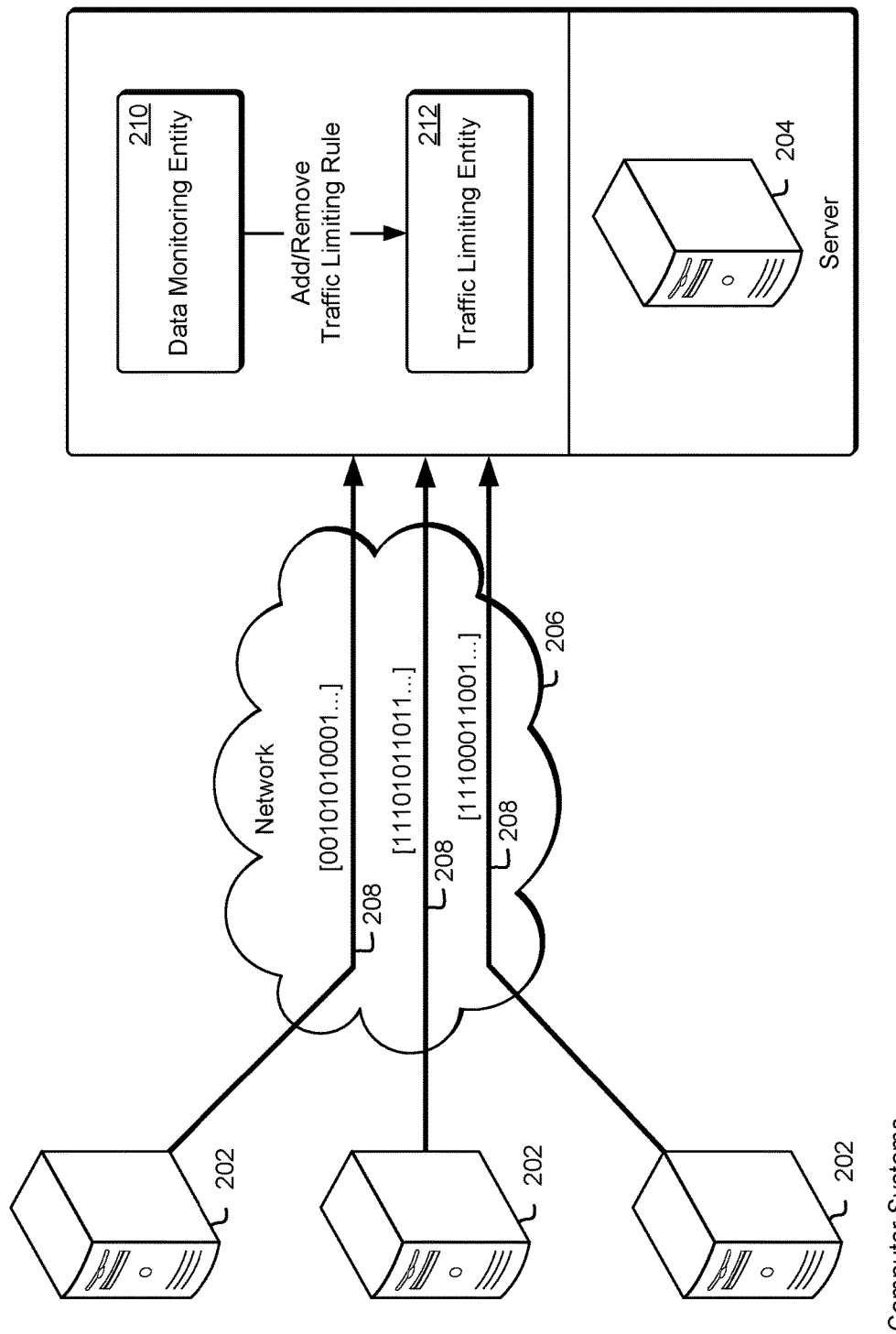
FIG. 2 shows an example of an environment for mitigating denial-of-service attacks in accordance with at least one embodiment.

FIG. 2 shows an example of an environment for mitigating denial of service attacks in accordance with at least one embodiment. In the environment, a plurality of computer systems 202 (singularly referred to herein as computer system 202) communicate with a server 204 over a network 206. A computer system 202 may be any type of device that is capable of communicating with the server 204 (for example, by sending requests to the server 204). For example, the computer system 202 may be a server or router in a network. Furthermore, the computer system 202 may be any type of consumer electronics device, such as a personal computer, tablet, smartphone or Internet-connected television or set-top box, among others. The network 206 may a public or a private network, whereby examples of the network 206 include the Internet, an Intranet or an Internet service provider (ISP) network, among others. In addition, the server 204 may be any type of device that is configured to receive a request (such as a web service request) from the computer system 202. Furthermore, the server 204 may be configured to process the request and respond to the request or forward the request along a routing path in the network or in another network, such as a private network (not shown) that is different from the network 206.

The plurality of computer system 202 may each transmit data 208 to the server 204. The data 208 may any type of information that is communicated to the server 204. The data 208 may also be packetized, for example, in accordance with a communication or networking protocol. The packet data may include one or more fields (for example, packet headers) that specify a destination address of the packet data as well as a source address of the packet data. The source address or destination address may be a host or network address. For example, the source address or destination address may be an Internet protocol (IP) address including an IPv4 or IPv6 address. The source address may specify an address of the computer system 202 sending the data 208, whereby the address may be used to identify the computer system 202. Furthermore, the destination address may specify an address of a device to which the data 208 is to be provided. If the destination address is the server's 204 address, the data may be routed to the server 204 by other devices (not shown). Furthermore, if the destination address is an address of a device that is different than the server 204, the server 204 may route the data further along a routing path to the device. As noted, although a server 204 is described with reference to FIG. 2, the server 204 may not be a final destination of data 208 received by the server 204. The server 204 may be a network router that forwards data in a network based at least in part on a routing configuration, such as a dynamically configured routing table.

The data 208 sent by the plurality of computer systems 202 may include a request such as a web service request, among others. Communication between the computer systems 202 and the server 204 may be performed in accordance with a request-response protocol, such as that of a client-server model. The request submitted by a computer system 202 may trigger the performance of one or more actions by the server 204, whereby the one or more actions may be computing operations. Furthermore, the server 204 may respond to the computer system's 202 request with a response. Before or after sending the response, the server 204 may acknowledge receipt of the request by sending an acknowledgement message to the computer system 202.

The request may be a Hypertext Transfer Protocol (HTTP) and the server 204 may be a web server. For example, the request may for retrieval of web content from the server 204. Receipt of the request by the server 204 necessitates that the server 204 evaluate the request to determine whether the request may be satisfied. If the request is to be satisfied, further computing operations may be performed by the server 204. For example, the server 204 may retrieve data, such as web content, from a cache or data store and provide the data to the computer system 202. By virtue of the fact the server 204 receives the request, the request may take up and consume at least a portion of the computing resources of the server 204. Furthermore, the delivery of the request, or generally data transmitted by the computer system 202, to the server 204 consumes network bandwidth.

When the server 204 receives a high volume of requests, latency in processing or satisfaction of the requests may be experienced by clients of the server 204. When a high volume of requests is received, some of the request may be enqueued pending the server 204 becoming available to satisfy the enqueued requests. As the volume increases, the latency also increases. Furthermore, some request may also be dropped by the server 204 and may not be processed or satisfied.

Denial-of-service (DoS) or distributed denial-of-service (DDoS) attack attempt to temporarily or indefinitely interrupt or suspend services provided by the server 204. In a distributed denial-of-service attack, a subset of the plurality of computer system 202 may be used to send data 208 to the server 204 so as to consume a portion of the computing resources of the server 204. Consuming the portion of the computing resources of the server 204 deprives other computer system 202 and users of their use and results in delays or interruptions of service. The subset of the plurality of computer system 202 used to send the data 208 to the server 204 may be controlled by an attacker, whereby the subset of the plurality of computer system 202 may be compromised for use in the distributed denial-of-service attack.

To mitigate distributed denial-of-service attacks, it may be necessary to block data transmitted by the subset of computer systems 202 (for example, the compromised computer system 202) from reaching the server 204. Accordingly, the subset of computer systems 202 are prevented from consuming the computing resources of the server 204. The resources of the server 204 may, therefore, be available to fulfill requests received from others legitimate users.

The server 204 is configured with a data monitoring entity 210. The data monitoring entity 210 may be an application that is executed on the server 204. For example, the data monitoring entity 210 may be a script that runs in a run-time environment that may interpret the script. Furthermore, another device that is different from the server 204 may be configured with the data monitoring entity 210. The data monitoring entity 210 may monitor data that is addressed to the server 204 and may determine a size of the data addressed to the server 204 originating from each computer system 202. Determining the size of the data addressed to the server 204 may include determining a number of requests or a number of packets of data originating from each computer system 202. Determining the number of requests received from each computer system 202 may include identifying based at least in part on the request the computer system 202 making the request. Furthermore, determining the number of packets of data received from each computer system 202 may include identifying a source address of each packet of data addressed to the server 204 and counting, over an observation interval, the number of packets having the source address. The observation interval may be a period of time, such as 5 minutes, or a number of received packets. For example, the observation interval may be 100,000 consecutive packets. As an alternative, the number of packets received from each computer system 202 may be probabilistically determined by, for example, sampling the packets addressed to the server 204.

After determining the number of packets received from each computer system 202, the data monitoring entity 210 may determine whether the number of packets received from each computer system 202 satisfies one or more conditions for limiting the computer system 202 traffic. The one or more conditions for limiting the computer system 202 traffic may be a threshold of a number of packets. For example, if the number of packets received from the computer system 202 meets or exceeds the threshold, the one or more conditions for limiting the computer system 202 traffic may be deemed to have been satisfied. Satisfying the or more conditions for limiting the computer system 202 traffic may be indicative that the computer system 202 is used in a distributed denial-of-service attack. For example, the established threshold may be met or exceeded because the computer system 202 is sending a larger number of data packets to the server 204 than historically observed.

The threshold may be established based at least in part on historically observed traffic activity of the computer system 202 and may be a function of the historically observed traffic activity of the computer system 202 over various preceding observation intervals. For example, the threshold may be an average observed number of packets received from the computer system 202 over the preceding observation intervals or within a permissible range of average. Further, the threshold may be dynamically adjusted to account for variability in the traffic of the computer system 202. In various embodiments, the threshold may be dynamically adjusted depending on a time of day, day of week, and the like. Furthermore, the threshold may be dynamically adjusted based at least in part on an event trigger, whereby the event trigger may include a launch of a product or service that alters the amount of traffic received by the server 204.

As a result of the one or more conditions for limiting the computer system 202 traffic being satisfied, traffic of the computer system 202 may be limited. Limiting the traffic of the computer system 202 may include setting a threshold of a number of packets originating sent by the computer system 202 that are provided to the server 204. As described herein, a packet may be determined to have been sent by the computer system 202 if the source address of the packet is that of the computer system 202. The threshold may be applicable to a time period, whereby once the threshold of the number of packets is met, excess packets are not provided to the server 204 or processed by the server 204. The threshold may in some embodiments be zero, whereby all the packets originating from the computer system 202 are discarded.

The threshold may be a function of the number of packets received from the computer system 202, whereby the function may be a portion or a percentage. For example, limiting the traffic of the computer system 202 may include providing only a certain percentage of the packets received from the computer system 202 over an observation interval to the server 204. The portion may be dynamically adjusted over time (for example, over various observation intervals). The dynamic adjustment may be a function of the number of packets received from the server over the observation intervals. For example, if the number of packets received from the computer system 202 continues to increase, the percentage of traffic permitted to reach the server 204 may be lowered and vice-versa. Thus, as the denial-of-service attack intensifies, the mitigation techniques are configured to react accordingly. Various limits to the traffic of the computer system 202 may be imposed at different observation intervals.

To limit the computer system's 202 traffic, a traffic limiting rule may be provided to a traffic limiting entity 212 of the server 204. As described herein, the traffic limiting rule may be provided to and enforced by an entity other than the server 204. For example, the traffic limiting rule may be provided to and enforced by a router that routes data from the computer system 202 to the server 204. The traffic limiting rule may, for example, be a firewall rule or an entry in a routing table or any entity in the network 206. The traffic limiting entity 212 may monitor data received from the computer system 202 and may regulate the data provided to the server 204 in accordance with the traffic limiting rule.

In another observation period, the data monitoring entity 210 may be configured with one or more conditions for removing traffic limits of the computer system 202. The data monitoring entity 210 may evaluate data originating from the computer system 202 over the other observation period to determine whether the one or more conditions for removing traffic limits of the computer system 202 are met. If the one or more conditions for removing traffic limits of the computer system 202 are met then the imposed limits on the data received from the computer system 202 are removed. Accordingly, the limits may no longer be enforced in a subsequent observation period.

However, if the one or more conditions for removing traffic limits of the computer system 202 are not met then the imposed limits on the data received from the computer system 202 are not removed. Further, the limits will be enforced over a subsequent observation period. Accordingly, utilization of the one or more conditions for limiting the computer system traffic is operable to mitigate distributed denial-of-service attacks by blocking or reducing the amount of traffic provided to the server 204 from a computer system 202 participating in a distributed denial-of-service attack. Additionally, utilization of the one or more conditions for removing traffic limits of the computer system 202 is operable to ensure that computer systems 202 falsely (for example, due to receipt of an unexpectedly large amount of traffic from the computer systems 202 over the observation interval) are not permanently blocked from accessing the server 204. The one or more conditions for removing traffic limits of the computer system 202 ensure that imposed limits may be removed if certain conditions are met. Furthermore, imposing the limits over an observation period and potentially removing the limits over a subsequent observation period as a result of evaluating the one or more conditions for removing the traffic limits over the same observation ensures that a computer that is falsely identified as being part of a distributed denial-of-service attack is only blocked from the server 204 for a maximum duration of an observation period.

Any computing system, such as a server, may be configured to implement the traffic monitoring entity 210. Furthermore, in various embodiments, more than one server may be used to perform the data monitoring. For example, as the volume of monitored data increases, the number of servers used to monitor the data may be increased to provide the requisite computing resources for monitoring the data. The number of servers, or generally, the computing resource utilized to monitor the data, may be scaled down if fewer resources are required to monitor the data.

Figure 3:
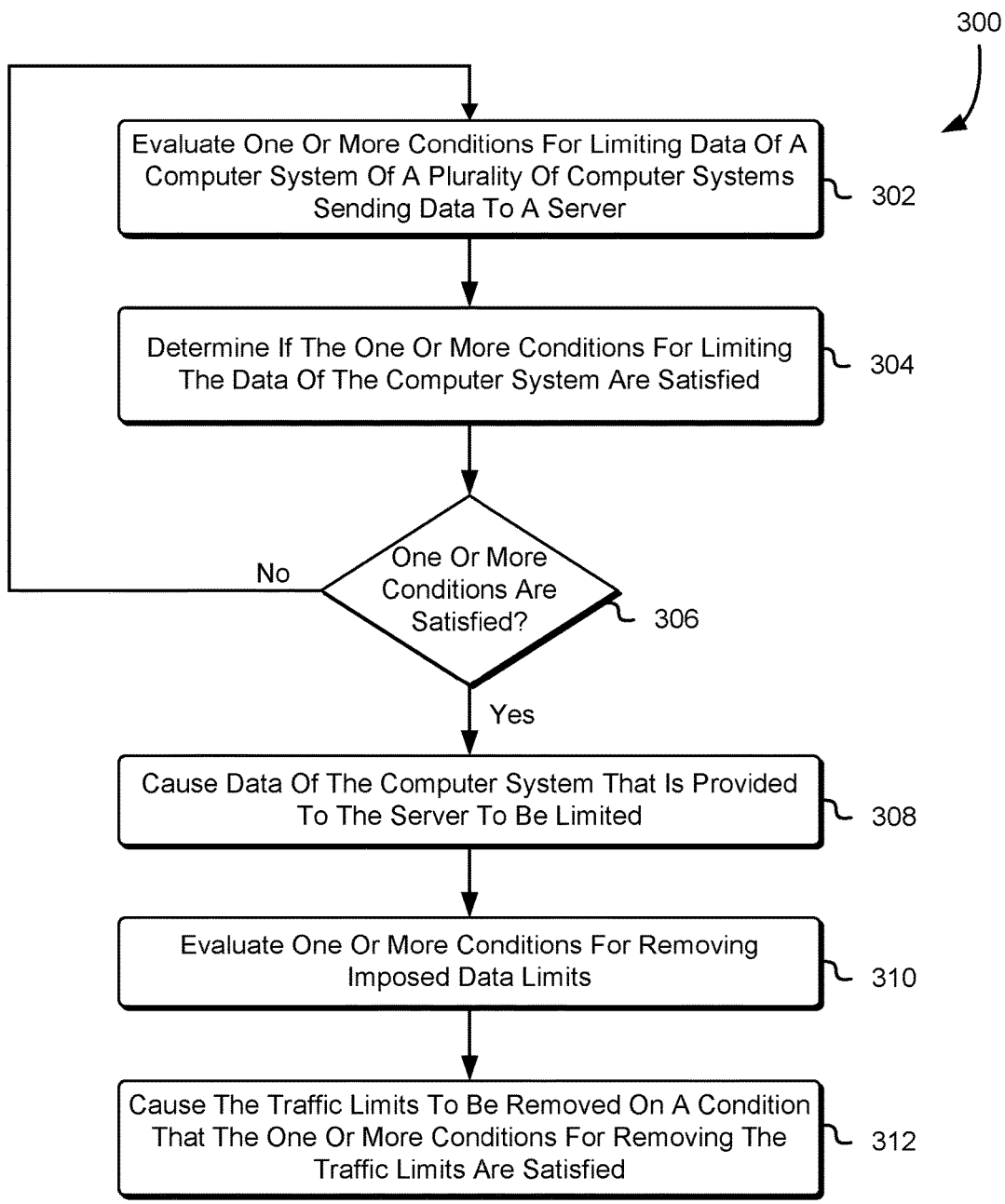
FIG. 3 shows an example of a method for mitigating a distributed denial-of-service attack in accordance with at least on embodiment.

FIG. 3 shows an example of a method for mitigating a distributed denial-of-service attack in accordance with at least on embodiment. In the process 300, a data monitoring entity, such as the data monitoring entity 210 described with reference to FIG. 2, evaluates 302 one or more conditions for limiting data of a computer system of a plurality of computer systems. The plurality of computer systems may send data to a server, such as the server 204 described with reference to FIG. 2. The data may be packets including a header specifying a host address (for example, Internet protocol address) associated with the computer system. Furthermore, the data may be a web service request sent by the computer system, among others, whereby if the data is a web service request, the request may include an identity of the computer system generating the request. Evaluating the one or more conditions may include inspecting the address information of the packets. The data monitoring entity may count the number of packets originating from the computer system to determine whether the number of packets meets or exceeds a threshold specified by the one or more conditions, whereby if the threshold is met or exceeded, the one or more conditions for limiting the data of the computer system may be determined to be met.

As shown in FIG. 3, the data monitoring entity determines 304 if the one or more conditions for limiting the data of the computer system are satisfied. If the one or more conditions for limiting the data of the computer system are determined 306 not to be satisfied, the process 300 reverts, whereby the data monitoring entity continues to evaluate 302 the one or more conditions for limiting data of the computer system. As described herein, the one or more conditions for limiting the data of the computer system may be evaluated over an observation interval, which may be a stream of packets addressed to the server. Furthermore, the observation interval may be a duration of time, whereby all packets addressed to the server and received by a device implementing the data monitoring entity in the duration of time are evaluated. If the one or more conditions for limiting the data of the computer system are determined not to be satisfied in a first observation interval, the one or more conditions may be evaluated again for a subsequent second interval. It is noted that the one or more conditions for limiting the data of the computer system for the first observation interval may be different than another set of conditions evaluated for the subsequent second interval. For example, the conditions may be changed or modified between intervals.

If the one or more conditions for limiting the data of the computer system are determined 306 to be satisfied, the data monitoring entity causes 308 data of the computer system that is provided to the server to be limited. For example, the data may be limited by setting a maximum limit for a size of the data, number of web service requests or number of packet of data originating from the computer system that are to be provided to the server. Data originating from the computer system in excess of the maximum limit may not be provided to the server. Furthermore, in various embodiments, the maximum limit may be zero, whereby data sent from the computer system to the server may be blocked from reaching the server or being processed by the server. Further, the data may be discarded without being evaluated. As described herein, a firewall rule may be put in place in a network that routes data to the server in order to cause the data to be limited or blocked. Furthermore, a routing configuration of a router may be changed such that the data is blocked from reaching the server.

The data monitoring entity then evaluates 310 one or more conditions for removing imposed data limits. The one or more conditions for removing imposed data limits may be evaluated while the computer system's data is limited. The one or more conditions for removing imposed data limits may specify a threshold of a maximum number of packets received from the computer system. The one or more conditions for removing imposed data limits may be deemed to be satisfied if the number of packets received from the computer system is below the threshold. When the number of packets is below the threshold, it may be indicative that the computer system is not part of a distributed denial-of-service attack and that the determination that the one or more conditions for limiting the data of the computer system may be a "false positive." Conversely, if the computer system is used for the distributed denial-of-service attack, the number of packets received from the computer system may remain above the threshold and, thus, the one or more conditions for removing imposed data limits may not be met. Accordingly, the imposed data limits may remain in place to mitigate the distributed denial-of-service attack.

The data monitoring entity then causes 312 the traffic limits to be removed on a condition that the one or more conditions for removing the traffic limits are satisfied. For example, if a firewall rule was put in place to block data provided by the computer from reaching the server, the firewall rule may be removed as a result of the one or more conditions for removing imposed data limits being met. It is noted that the firewall rule may be re-imposed as a result of conditions for limiting the data of the computer system being met in a subsequent observation interval.

Figure 4:
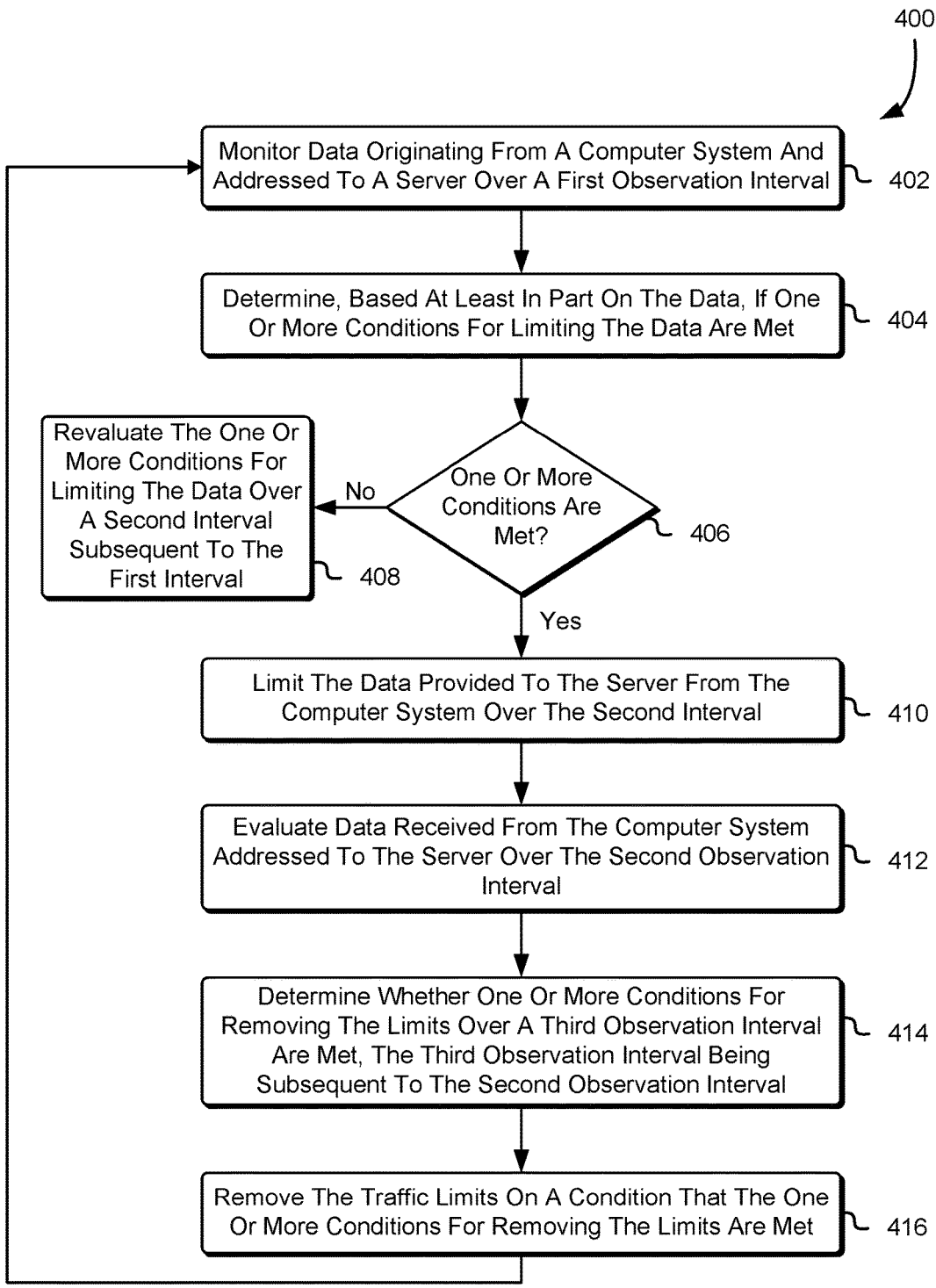
FIG. 4 shows an example of a method for mitigating a distributed denial-of-service attack in accordance with at least on embodiment.

FIG. 4 shows an example of a method for mitigating a distributed denial-of-service attack in accordance with at least on embodiment. In the process 400, a data monitoring entity, such as the data monitoring entity 210 described with reference to FIG. 2, monitors 402, over a first observation interval, data originating from a computer system and addressed to a server. The monitoring may include counting the number of packets that are addressed to the server and the source address of the computer system. The data monitoring entity then determines 404, based at least in part on the data, if one or more conditions for limiting the data are met. As described herein, the one or more conditions for limiting the data may be met if the counted number of packets that are received from the computer system exceeds a threshold.

If it is determined 406 that the one or more conditions for limiting the data are not met, the data monitoring entity revaluates 408 the one or more conditions for limiting the data over a second interval subsequent to the first interval. Each observation interval may be a sequence of packets that are addressed to the server. The sequence of packets may be overlapping or non-overlapping. For example, the packets addressed to the server may be segmented over time in a plurality of segments, whereby each segment may be include a specified number of packets.

If it is determined 406 that the one or more conditions for limiting the data are met, the data monitoring entity limits 410 the data provided to the server from the computer system over the second interval. Limiting the data provided to the server from the computer system over the second interval may include blocking data received from the computer system over the second interval from reaching the server. Alternatively, a maximum number of data packets sent from the computer system may be permitted during the second observation interval and packets exceeding the limit may be blocked or discarded.

The data monitoring entity then evaluates 412 data received from the computer system addressed to the server over the second observation interval. The second observation interval may be subsequent to the first observation interval. For example, if the first observation interval is 100,000 consecutively received packets that are addressed to the server, the second observation interval may be another 100,000 consecutive packets that are addressed to the server that are received after the packets of the first observation interval. Because the data provided to the server from the computer system is limited 410 over the second interval, the process 400 dictates that while the data of the computer is limited (for example, blocked from reaching the server), the data of the computer system that is addressed to the server is continuing to be evaluated.

The data monitoring entity then determines 414 whether one or more conditions for removing the limits over a third observation interval are met, whereby the third observation interval is subsequent to the second observation interval. The one or more conditions for removing the limits may include a count of a number of packets received from the computer system being below a threshold. If the one or more conditions for removing the limits are met, the limits may be removed over the third observation interval and data packets of the computer system may be provided to the server over the third observation interval. Following removing the limits, the one or more conditions for limiting may be continued to be evaluated over the third observation interval to determine whether the data of the computer system is to be limited over a subsequent interval.

If the one or more conditions for removing the limits are not met, the one or more conditions may be continued to be evaluated over subsequent intervals until they are met for an observation interval, whereby upon the one or more conditions being met the traffic limits may be removed as described herein. If the one or more conditions for removing the limits are never met, the traffic limits may be enforced indefinitely and as long as the server is in operation. The data monitoring entity then removes 416 the traffic limits if the one or more conditions for removing the limits are met.

After the traffic limits are removed, the process 400 reverts to monitoring the data received from the computer system over the third interval. Further traffic limits may be enforced as a result of evaluating the received data. The traffic limits may be continued to be enforced over various subsequent observation intervals or removed following enforcement as described herein. The evaluation of the data received from the computer system for the purpose of adding or removing traffic limits may be continued to be performed into perpetuity over many observation intervals and while the server is in service.

Figure 5:
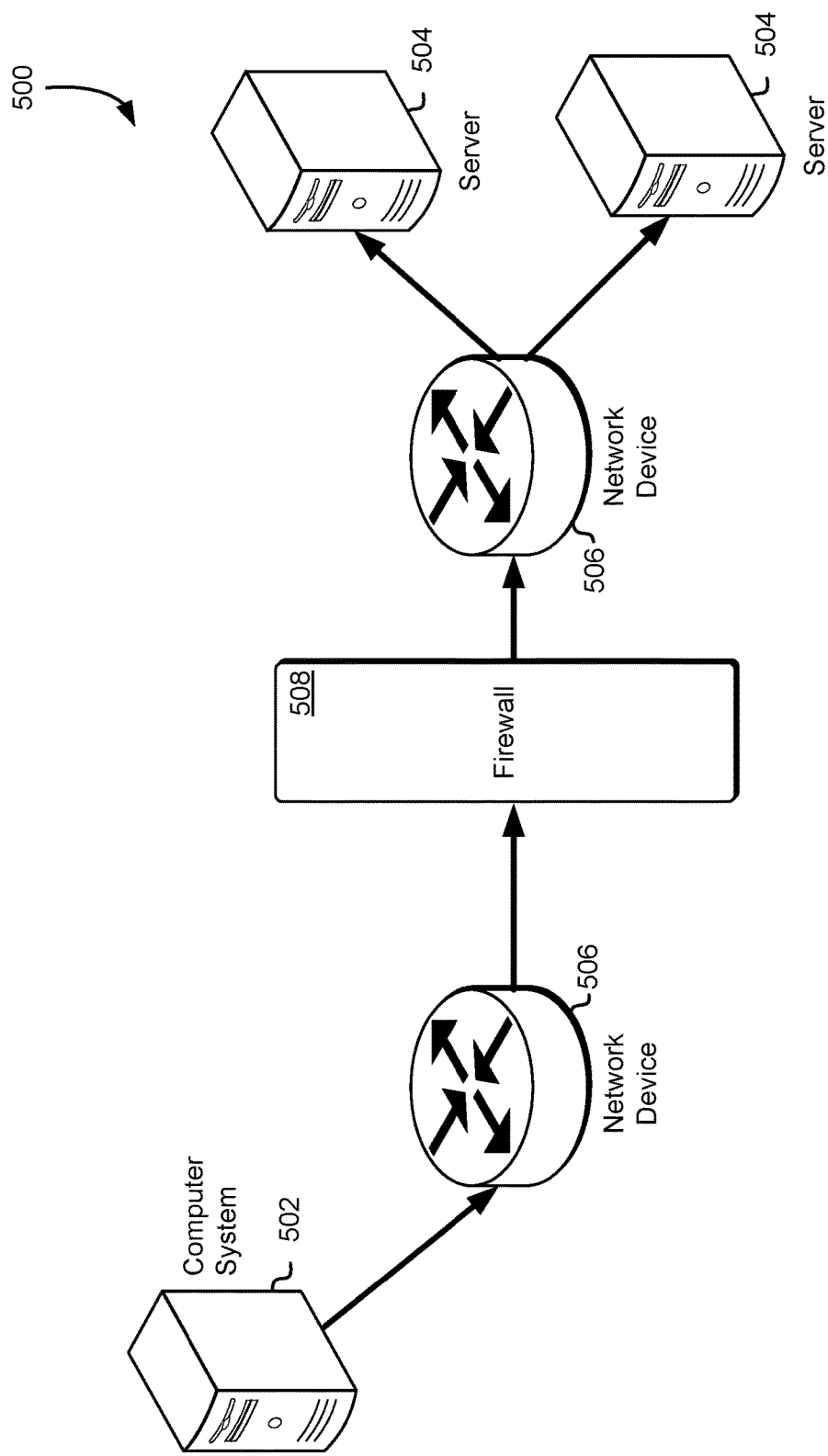
FIG. 5 shows an example of an environment for mitigating a denial-of-service attack in accordance with at least on embodiment.

FIG. 5 shows an example of an environment for mitigating a denial-of-service attack in accordance with at least on embodiment. In the environment 500, a computer system 502, which may be similar to the computer system 202 described with reference to FIG. 2, sends data to one or more servers 504, whereby a server may be similar to the server 204 described with reference to FIG. 2. The computer system 502 communicates with the one or more server 504 over a network that includes a plurality of network devices 506 and a firewall 508. A network device 506 may be a router that is configured to route data between the computer system 502 and the server 504. The network device 506 may also be an edge router that routes data to a sub-network (for example, of an organization) from a wider network such as the Internet. The edge router may be an entry point into an enterprise network or a service provider network. For example, data received from a wider network (such as the Internet) may be routed to the edge router, and the edge router may forward the data to other routers or servers within the service provider's network. Either network device 506 shown in FIG. 5 may route data pertaining to a region (or a zone) of the service provider network and the servers 504. The routing may be based at least in part on the source address of the data. For example, the globe may be partitioned into various regions and a data center or "server farm" housing the servers 504 may be established for serving a computer system 502 sending data (for example, web service requests) from a region.

The network devices 506 or the server 504 may be configured with a data monitoring entity, such as the data monitoring entity 210 described with reference to FIG. 2. The data monitoring entity may monitor data addressed to one or more servers (for example, of one zone of the service provider network or more than one zone of the service provider network). Monitoring the data may be performed by inspecting received or routed data or inspecting logs (for example, having a plurality of log entries) of the network devices 506 or servers 504, whereby the logs may specify source addresses of the data. Packets or log entries may be captured from an Apache HTTP server, NGINX HTTP server, mail server or load balancer, among others. If the data of the computer system is to be limited, a rule for limiting (for example, blocking) the data may be added to the firewall 508. Furthermore, routing tables of the network device 506 may be configured to limit (or block) data originating from the computer system 502.

Rules for limiting the data may be propagated to various zones or data centers of the service provider or other entities. For example, the servers 504 may be associated with a first zone or data center of the service provider and the data addressed to the servers 504 may be monitored to identify the rules for limiting the data. The rules for limiting the data may be enforced for the first zone or data center. Furthermore, the rules for limiting the data may be propagated to other zones or data centers such that if traffic is redirected to servers in the other zones or data centers, the rules for limiting the data may be enforced in the other zones or data centers that are different from the first zone or data center. Alternatively, each zone or data center may independently evaluate received traffic and determine whether to enforce or remove data limiting rules. In various embodiments, a determination to remove the enforced rules for limiting the data may also be propagated to various zones or data centers. Or alternatively, each zone or data center may independently evaluate whether to remove the enforced rules for limiting the data as described herein.

Monitoring the data of the computer system 502 and limiting the data of the computer system that is provided to the servers 504 may be performed by entities other than the servers 504, such as the network devices 506 or the firewall 508. That is, monitoring and limiting the data may be performed "upstream" with respect to the server 504. Furthermore, a management interface, such as a portal or a graphical user interface (GUI), may be provided to a client or customer of the service provider for which the servers 504 are provisioned. The management interface may be used to specify the various conditions described herein for mitigating a denial-of-service attack. Furthermore, the management interface may provide customers of the service provider with a count of the number of packets received from various computer system addresses in real time. Administrators of customer resources may manage the established thresholds accordingly.

In each zone, an upstream network device 506 may monitor data that is addressed to a downstream server 504. The upstream network device 506 may evaluate the data as described herein. Based at least in part on the evaluation, the upstream network device 506 may send a request to the downstream server 504 or an intervening downstream network device 506 to limit the data. The request may be queued in a queue and the downstream server 504 or the intervening downstream network device 506 may retrieve the request from the queue. Multiple downstream servers 504 or intervening downstream network devices 506 in various zones may retrieve requests for limiting data from the queue. Furthermore, the queue may be provided by a queue service of the service provider.

Figure 6:
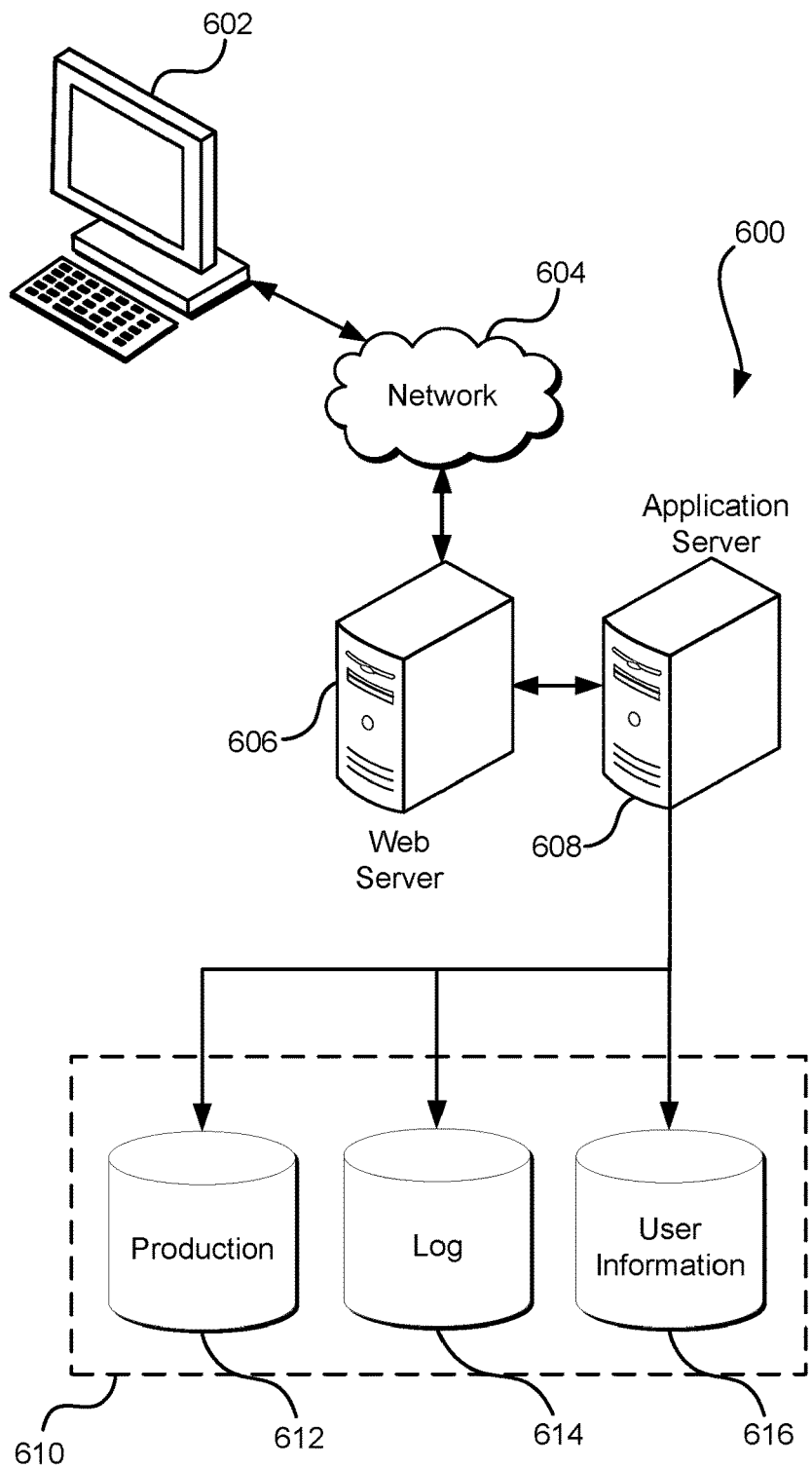
FIG. 6 illustrates an environment in which various embodiments can be implemented.

FIG. 6 illustrates aspects of an example environment 600 for implementing aspects in accordance with various embodiments. As will be appreciated, although a web-based environment is used for purposes of explanation, different environments may be used, as appropriate, to implement various embodiments. The environment includes an electronic client device 602, which can include any appropriate device operable to send and/or receive requests, messages or information over an appropriate network 604 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 606 for receiving requests and serving content in response thereto, although for other networks an alternative device serving a similar purpose could be used as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 602 and the application server 608, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 610 can include several separate data tables, databases, data documents, dynamic data storage schemes and/or other data storage mechanisms and media for storing data relating to a particular aspect of the present disclosure. For example, the data store illustrated may include mechanisms for storing production data 612 and user information 616, which can be used to serve content for the production side. The data store also is shown to include a mechanism for storing log data 614, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. The application server 608 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 602. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    determining a first number of packets received over a first observation interval having a source network address during which a restriction on access to a server is not active;
    as a result of the first number of packets exceeding a first threshold, imposing the restriction on access to the server by packets having the source network address, the restriction on access to be applied over a second observation interval;
    determining a second number of packets received over the second observation interval having the source network address, during which the restriction is applied to incoming packets; and
    as a result of the second number of packets failing to exceed a second threshold that is different from the first threshold, removing the restriction.

2. The computer-implemented method of claim 1, further comprising determining the first threshold based at least in part on a number of packets having the source network address received over an observation interval preceding the first observation interval.

3. The computer-implemented method of claim 1, further comprising limiting a number of packets having the source network address that are provided to the server over the first observation interval to the first threshold.

4. The computer-implemented method of claim 1, further comprising, as a result of the second number of packets exceeding the second threshold, causing access to the server by packets having the source network address to be restricted over a third observation interval subsequent to the second observation interval.

5. The computer-implemented method of claim 1, further comprising setting the first threshold and the second threshold as a result of input received into an interface.

6. The computer-implemented method of claim 1, further comprising updating information for an interface based at least in part on the first number of packets and the second number of packets.

7. The computer-implemented method of claim 1, wherein the first observation interval is a predetermined amount of time.

8. A system, comprising:
    one or more processors; and
    memory that stores instructions that, if executed by the one or more processors, cause the system to at least:
        determine if data received over a first observation interval during which a limit is not in place exceeds a first threshold;
        if data received over the first observation interval exceeds the first threshold, cause the limit to be placed on data provided to a server over a second observation interval;
        determine whether one or more conditions for removing the limit are met while the limit is placed, wherein the one or more conditions for removing the limit are met based at least in part on a number of data packets received from a particular source address over the second observation interval being below a second threshold that is different from the first threshold; and
        as a result of the one or more conditions for removing the limit being met, cause the limit to be removed.

9. The system of claim 8, wherein the first threshold is based at least in part on a number of packets having the particular source address.

10. The system of claim 9, wherein the second threshold indicates a false positive identification of participation in a denial of service attack.

11. The system of claim 8, wherein the limit is specific to data with the particular source address.

12. The system of claim 8, wherein the instructions further cause the system to configure the limit based at least in part on information received through an interface.

13. The system of claim 8, wherein the second observation interval is defined based at least in part on a number of received packets with a destination address corresponding to the server.

14. A non-transitory computer-readable storage medium having stored thereon executable instructions that, as a result of execution by one or more processors of a computer system, cause the computer system to at least:
    determine a first number of packets received over a first observation interval having a source network address;
    as a result of the first number of packets exceeding a first threshold, restrict access to a server by packets having the source network address; and
    as a result of a second number of packets having the source network address being received over a second observation interval, during which a restriction is active, failing to exceed a second threshold that is different from the first threshold, remove the restriction.

15. The non-transitory computer-readable storage medium of claim 14, wherein the first number of packets have a destination address corresponding to the server.

16. The non-transitory computer-readable storage medium of claim 14, wherein the server is provisioned for a customer of a service provider that operates the computer system.

17. The non-transitory computer-readable storage medium of claim 14, wherein the second observation interval is defined based at least in part on an amount of time.

18. The non-transitory computer-readable storage medium of claim 14, wherein the restriction is a rate limit.

19. The non-transitory computer-readable storage medium of claim 14, wherein the restriction is specific to data packets with the source network address.

20. The non-transitory computer-readable storage medium of claim 14, wherein the computer system is a firewall.

* * * * *